No. 890,401. PATENTED JUNE 9, 1908.
J. T. BENTHALL.
PEANUT STEMMER.
APPLICATION FILED JAN. 12, 1906.
2 SHEETS—SHEET 1.
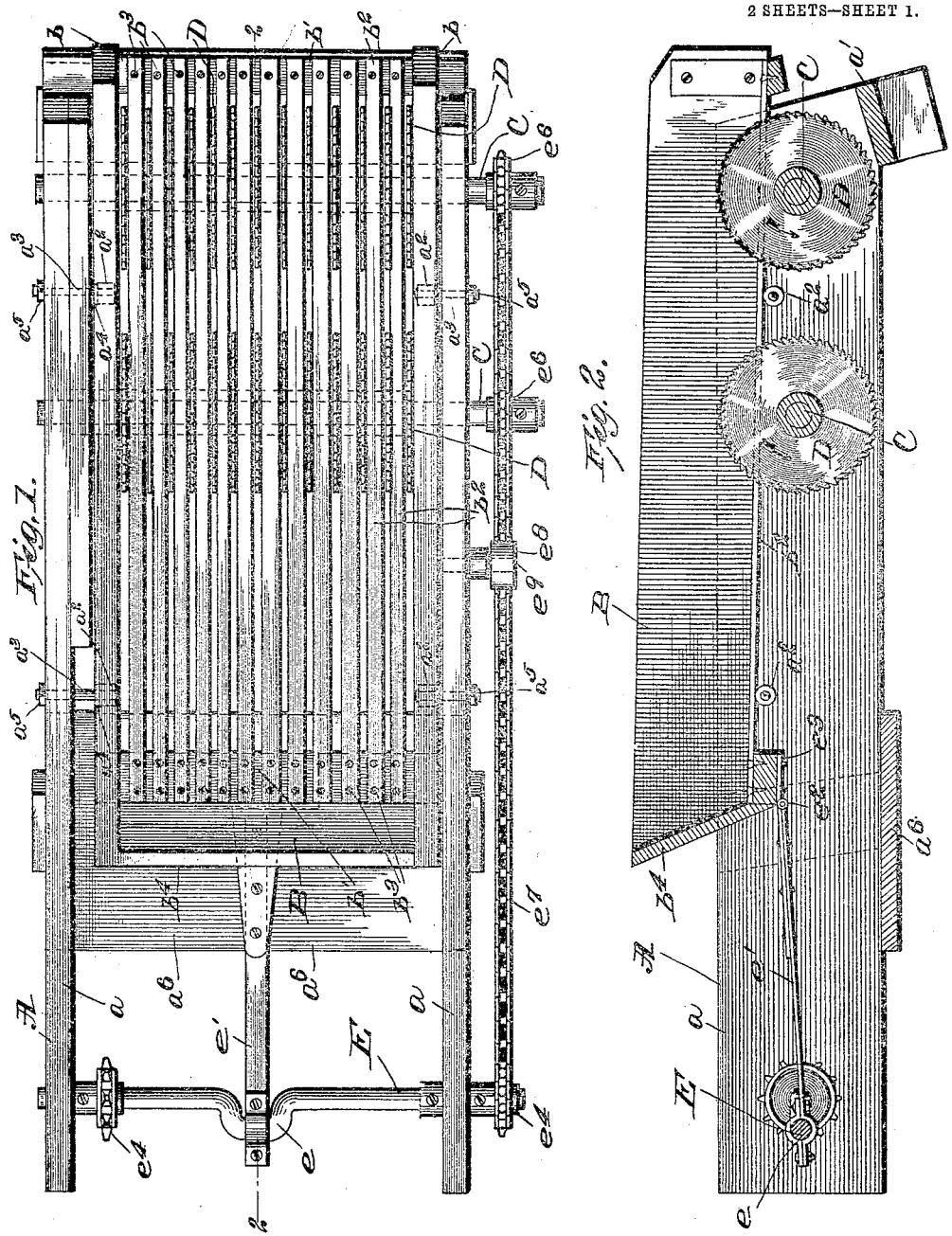
WITNESSES:
E. M. Callaghan
C. E. Trainor
INVENTOR
JESSE T. BENTHALL
BY Munn & Co.
ATTORNEYS

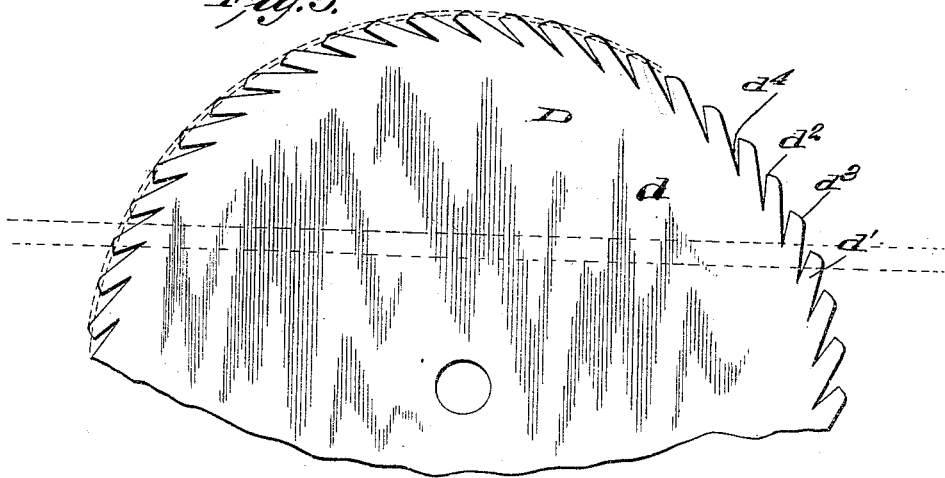
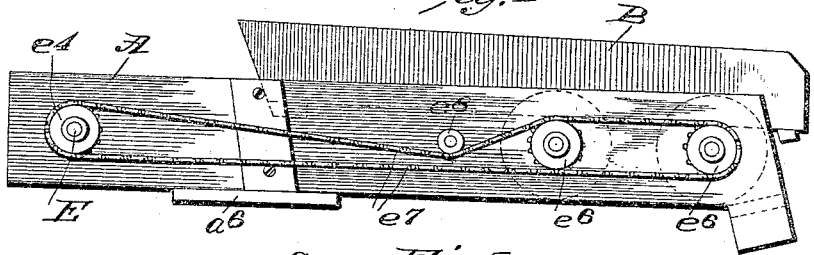
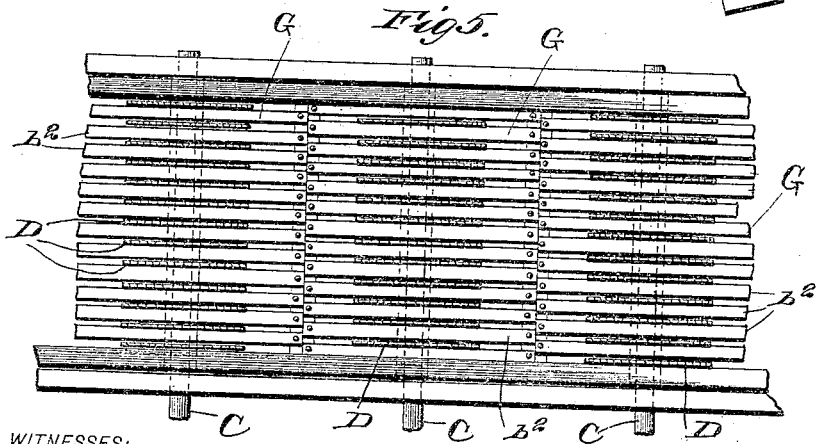

UNITED STATES PATENT OFFICE.

JESSE T. BENTHALL, OF AHOSKIE, NORTH CAROLINA.

PEANUT-STEMMER.

No. 890,401.  Specification of Letters Patent.  Patented June 9, 1908.

Application filed January 12, 1906. Serial No. 295,743.

*To all whom it may concern:*

Be it known that I, JESSE T. BENTHALL, a citizen of the United States, and resident of Ahoskie, in the county of Hertford and State of North Carolina, have made certain new and useful Improvements in Peanut-Stemmers, of which the following is a specification.

My invention is an improvement in peanut stemmers, and consists in certain novel constructions and combinations of parts hereinafter described and claimed.

Referring to the drawings forming a part hereof, Figure 1 is a plan view of my improvement. Fig. 2 is a section on the line 2—2 of Fig. 1, looking in the direction of the arrow. Fig. 3 is a detail view of a part of one of the stemming devices. Fig. 4 is a side view of the complete stemmer, and Fig. 5 is a plan view showing a different arrangement of the stemming devices.

In the practical application of my invention, I provide a lower frame A, comprising longitudinal bars $a$ connected at their rear ends by a cross bar $a'$, and at a short distance from their front ends by a second cross bar $a^6$. An upper frame B, comprising the longitudinal bars $b$ connected at their front and rear ends by the cross bars $b'$, is supported above the lower frame upon friction rollers $a^2$, journaled upon pins $a^3$ secured to the sides of the lower frame.

The front ends of the longitudinal bars of the upper frame B, are beveled upwardly as shown in Fig. 2 and are connected by a plate $b^4$. The bottom of said upper frame is composed of a plurality of metal slats $b^2$ secured at their ends to the cross bar $b'$ by means of screws $b^3$, the front ends of the slats being provided with two screws and the rear ends with one.

A plurality of mandrels C are journaled transversely of the lower frame and spaced apart from each other, said mandrels being adapted to support the stemmers D.

The stemmers D each comprise a disk $d$ having upon the periphery thereof, a plurality of spaced teeth $d'$ arranged in such manner that the point $d^2$ of the tooth is nearer the center of the disk than the heel $d^3$ thereof. From an inspection of Fig. 3, it will be evident that the points of the teeth are all within the circumference of the circle, having the same center as the disk and with a radius equal to the distance from said center to the heels of the teeth. The throat $d^4$ between the teeth, is of a width sufficient to receive a peanut vine or stem, but too narrow to catch the nut itself.

It will be noticed from inspection of Fig. 3, that the sides of the throat meet each other at an acute angle, and that the front edge of each tooth is straight, and that the widest part of the throat is approximately the width of the tooth. By this construction the stems when engaged by the throat are drawn to the bottom thereof, and the gradual narrowing of the stem exerts a wedging action on the stem, thus gripping the same sufficiently tight to draw it between the slats and to strip the nuts therefrom. By having the front edge of the throat straight, the stem is easily released from the throat upon reaching the lowest part of the disk, since there are no projections or hooks on the front edge of the tooth to retain the said stem. Each mandrel is provided with stemming devices corresponding in number to the openings between the slats, and approximately a third of the disk projects through said opening.

Journaled in the free ends of the longitudinal bars $a$, is a shaft E, having a cranked portion $e$, to which is pivoted an arm $e'$, hinged as at $e^2$ to a bracket $e^3$ arranged upon the front cross bar $b'$ of the upper frame. It is evident that when the shaft E is rotated, the upper frame will be vibrated to and from the stemming devices upon the friction rollers.

A sprocket wheel $e^4$ is secured to the shaft E within the frame for imparting motion thereto, and the outer end of the shaft is provided with a second sprocket wheel $e^4$, connected by a sprocket chain $e^7$ with sprocket wheels $e^6$ upon the extended ends of the mandrels C. An idler $e^8$ journaled upon a pin $e^9$, secured to the lower frame, is arranged to engage the upper run of the sprocket chain, to maintain the same in mesh with the sprocket wheels.

The friction rollers $a^2$ are journaled upon headed bolts $a^3$, the bolts traversing openings in the longitudinal bars and being secured upon the opposite side thereof by nuts $a^5$.

A washer $a^4$ is arranged between the friction roller and the longitudinal bar to afford a bearing for the edge of the roller.

In Fig. 5, I have shown another arrangement of the stemming devices, comprising three mandrels C, the stemming devices upon each mandrel being staggered in relation to the stemming devices upon the preceding one. With this arrangement, the bottom of the upper frame is composed of a plurality of series G of longitudinally arranged slats, the series corresponding in number to the mandrels, and the members of each series staggered with respect to the members of the preceding series. With the above arrangement, the unstemmed peanuts passing through the stemming devices on the first mandrel, will be engaged by the stemming devices on the second mandrel, since they are in direct line with the passage between the stemming devices of the first mandrel.

It will be evident from an inspection of Fig. 2, that the upper frame is inclined slightly to the rear with respect to the lower frame, so that when the said frame is reciprocated, it will tend to move the vines to the rear of the frame while at the same time keeping them constantly agitated.

In operation, the vines are fed into the upper frame or hopper, by any suitable means. The vibration of the hopper feeds them toward the stemming devices by which the stems are engaged and drawn between the slats which are far enough apart to permit the passage of the stems but too close to permit the passage of the nuts, which are stripped from the stems and pass outwardly at the rear of the upper frame, the vines falling from the stemming devices through the lower frame.

By arranging the teeth of the stemming devices with their points nearer to the center of the disks than are their heels, any cutting action of the teeth is prevented, they acting merely to draw the stems downwardly between the slats. By this arrangement of teeth, no cutting or bruising of the shell of the nuts is possible.

As ordinarily used, the disks of the stemming devices are approximately six inches in diameter, and the teeth approximately one-eighth of an inch wide, the throat being approximately one-eighth of an inch wide and one-fourth of an inch deep. With a stemming device so constructed, it is obvious that no injury can result to the shells from the teeth, since there is no cutting edge thereon, and the throat is not of a width sufficient to permit the entrance of the nut.

The teeth of the disks are inclined to radii of the disks, and the disks are arranged in the frame with the inclination of the teeth toward the feed, the disks also being rotated toward the feed.

What I claim is:

1. In a peanut stemmer, and in combination, a relatively long open rectangular frame, friction rollers journaled at the corners thereof, a relatively short rectangular frame resting on the rollers, the bottom of said short frame being composed of a series of longitudinally arranged transversely spaced slats, a plurality of mandrels journaled transversely of the lower frame and spaced apart from each other, spaced stemming devices secured to the mandrels, each device comprising a disk having upon the periphery thereof spaced teeth, the points of the teeth being within the circumference of the circle whose radius is equal to the distance from the center of the disk to the heels of the teeth, means for vibrating the upper frame toward and from the stemming devices, comprising a shaft journaled in the lower frame and having a cranked portion, an arm hinged to the upper frame and pivoted on the cranked portion, and means for rotating the shaft and the mandrels.

2. In a peanut stemmer and in combination, an open lower rectangular frame, friction rollers at the corners thereof, a vibrating upper rectangular frame resting upon the rollers, the bottom of said upper frame being composed of a plurality of series of longitudinally arranged spaced slats, the members of each series being staggered with respect to the members of the preceding series, a mandrel journaled in the lower frame adjacent to each series, stemming devices on the mandrels corresponding to the openings between the slats and projecting therethrough, and means for vibrating the upper frame towards and from the stemming devices.

3. In a peanut stemming device, the combination with the frame, of a plurality of mandrels journaled in the frame, stemming devices on the mandrels, each comprising a disk provided on its periphery with spaced teeth, the points of the teeth being within the periphery of the circle whose center is the center of the disk and whose radius is equal to the distance from the center of the disk to the heel of the teeth, means for receiving the vines, and means for vibrating said receiving means toward and from the stemming devices.

4. In a peanut stemmer, a stemming device comprising a disk provided on its periphery with a plurality of teeth, said teeth being inclined to radii of the disks, and having their front edges straight, the edges of the adjacent teeth meeting at an acute angle, and the points of the teeth being nearer the centers of the disks than the heels thereof, and the spaces between the teeth being of a width at the widest part approximately equal to that of the teeth.

5. In a peanut stemmer, a stemming device comprising a disk provided on its periphery with a plurality of spaced teeth having straight front edges, the heels of the teeth being farther from the centers of the disk than the points thereof, whereby to form a guard for the point, and the edges of the adjacent teeth meeting at an acute angle whereby to exert a wedging action on the stem.

JESSE T. BENTHALL.

Witnesses:
 J. B. BARNACASCEL,
 W. B. SMALL.